J. W. SNAPP.
Grub or Sprout Extractor.
No. 220,501. Patented Oct. 14, 1879.
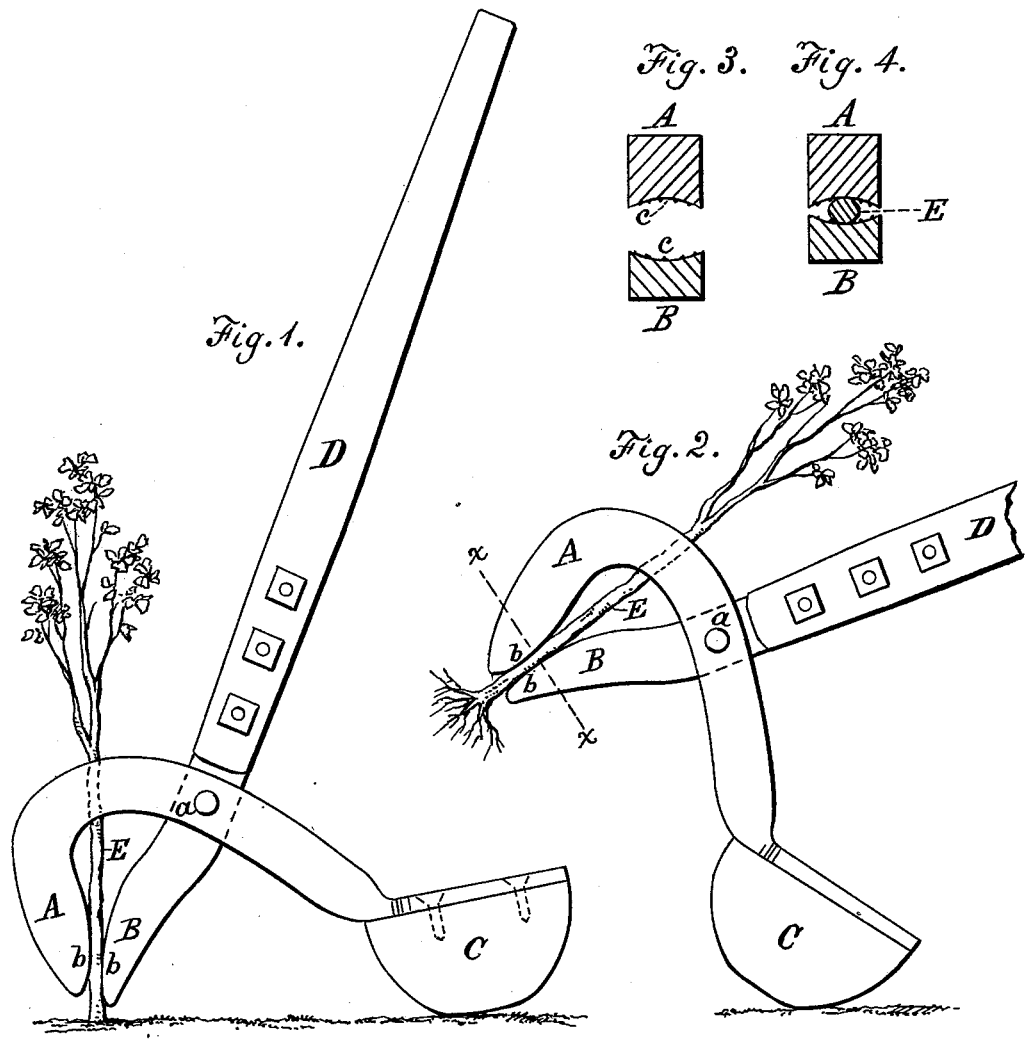

UNITED STATES PATENT OFFICE.

JAMES W. SNAPP, OF JASPER, TENNESSEE, ASSIGNOR OF ONE-HALF OF HIS RIGHT TO CHARLES H. VANN, OF SAME PLACE.

IMPROVEMENT IN GRUB OR SPROUT EXTRACTORS.

Specification forming part of Letters Patent No. 220,501, dated October 14, 1879; application filed August 30, 1879.

*To all whom it may concern:*

Be it known that I, JAMES W. SNAPP, of the town of Jasper, in the county of Marion and State of Tennessee, have invented certain new and useful Improvements in Grub or Sprout Extractors; and I do hereby declare that the following is a full, clear, and exact description of the invention, which will enable others skilled in the art to which it appertains to make and use the same, reference being had to the accompanying drawings, and to the letters of reference marked thereon, which form a part of this specification, in which—

Figure 1 is a side view, showing the puller in position for pulling a grub. Fig. 2 is a side view, showing the position of the puller with a grub pulled. Figs. 3 and 4 are transverse sections of the jaws on line X X, showing the concavity of their grasping-surfaces.

My invention relates to grub-pullers adapted to be operated by hand.

The grub-pullers as heretofore constructed have their jaws formed sharp and straight laterally, similar to the jaws of a pair of pinchers, and in use it is found that they are liable to cut or break off the grub; and a puller having the fulcrum-block connected to one of the jaws by a pivotal joint is found to be objectionable because the fulcrum should be steady laterally.

To avoid these difficulties I construct a puller having the two jaws rounded longitudinally and concaved laterally on their grasping-surfaces, to prevent the liability of cutting or breaking the grub; and having the fulcrum-block provided with a rounded bearing-surface, rigidly attached to one of the jaws, as hereinafter more fully described, and as shown in the drawings.

In the drawings, A and B represent the jaws, pivoted together at $a$, and rounded longitudinally, as shown at $b$ $b$, and concaved laterally on their grasping-surfaces, as shown at $c$ $c$.

The jaw A is curved, as shown in the drawings, and is rigidly attached at its back part to the fulcrum-block C, having a rounded bearing-surface. The bearing-surface of this block is straight longitudinally, and is of sufficient length to furnish a steady bearing laterally.

D represents the handle attached to the upper part of the jaw B.

The grasping-surfaces of the jaws are provided with teeth or corrugations to prevent them from slipping off a grub.

The puller being placed in position, as shown in Fig. 1 of the drawings, with the fulcrum resting on the ground and the jaws grasping a grub, E, downward pressure on the handle causes the jaws to grasp tightly the grub, and pulls it up, as shown in Fig. 2 of the drawings.

It will be readily seen that the rounded and convexed shape of the jaws prevents the liability of cutting or breaking off the grub.

What I claim as new, and desire to secure by Letters Patent, is—

1. The grub-puller having the jaws A B, rounded and concaved on their grasping-surfaces, substantially as and for the purposes described.

2. The grub-puller having the jaws A B, concaved and rounded, as described and shown, and having the jaw A rigidly attached to the fulcrum-block C, having a rounded bearing-surface, substantially as and for the purposes set forth.

In testimony that I claim the foregoing as my own invention I affix my signature in presence of two witnesses.

JAMES W. SNAPP.

Witnesses:
J. L. MINTER,
W. F. LEWIS.